US009575575B2

(12) United States Patent
Nicholson et al.

(10) Patent No.: US 9,575,575 B2
(45) Date of Patent: Feb. 21, 2017

(54) SIGNAL-GENERATING STYLUS, SYSTEM, AND METHOD

(71) Applicant: Lenovo (Singapore) Pte. Ltd., New Tech Park (SG)

(72) Inventors: John Weldon Nicholson, Cary, NC (US); Scott Edwards Kelso, Cary, NC (US); Steven Richard Perrin, Raleigh, NC (US); John Miles Hunt, Raleigh, NC (US); Song Wang, Cary, NC (US); Matthew Lloyd Hagenbuch, Durham, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 125 days.

(21) Appl. No.: 14/603,625

(22) Filed: Jan. 23, 2015

(65) Prior Publication Data

US 2016/0216783 A1   Jul. 28, 2016

(51) Int. Cl.
*G06F 3/0354* (2013.01)
*G06F 3/038* (2013.01)

(52) U.S. Cl.
CPC ......... *G06F 3/03545* (2013.01); *G06F 3/0383* (2013.01)

(58) Field of Classification Search
None
See application file for complete search history.

(56) References Cited

U.S. PATENT DOCUMENTS

| | | | | |
|---|---|---|---|---|
| 6,249,234 B1* | 6/2001 | Ely | ...................... | G01D 5/2073 178/18.06 |
| 2009/0189871 A1* | 7/2009 | Yoon | ....................... | G06F 3/016 345/173 |
| 2013/0009907 A1* | 1/2013 | Rosenberg | .............. | G06F 3/046 345/174 |
| 2014/0165742 A1* | 6/2014 | Fergusson | ........... | G06F 3/03545 73/862.68 |
| 2015/0022487 A1* | 1/2015 | Kuo | .................... | G06F 3/03545 345/174 |

* cited by examiner

*Primary Examiner* — Nicholas Lee
(74) *Attorney, Agent, or Firm* — Dean D. Small; The Small Patent Law Group, LLC (57) ABSTRACT

A system and method may include a device including a user interface, a detector, and a central processing unit (CPU) in communication with the detector. The CPU controls operation of the device. A stylus is used to input data with respect to the device. The stylus may include a main body and an engagement member operatively coupled to the main body. The engagement member alters a mechanical relationship within the main body in response to engagement by a user. The stylus generates a signal in response to the altered mechanical relationship within the main body. The detector detects the signal generated by the stylus. The CPU performs an action in response to detection of the signal.

17 Claims, 5 Drawing Sheets

SIGNAL-GENERATING STYLUS, SYSTEM, AND METHOD

BACKGROUND

Embodiments of the present disclosure generally relate to a stylus and to a device that includes a stylus, and, more particularly, to a stylus having an engageable member, such as a button or deflectable tip.

Devices, such as personal computers, laptop computers, electronic tablets, smart phones, watches, smart cards, and various other handheld components, are ubiquitous. Mobile devices, such as laptop computers, electronics tablets, smart phones, and the like, are easily transported between locations. Many devices include user interfaces, such as touch screen displays. A handheld stylus may be used to input data through a user interface of a device.

A known electromagnetic resonance stylus includes a resonant circuit and a coil. As a tip of the stylus is deflected, the relationship between the resonant circuit and coil changes, thereby changing an output resonance, which may be detected by a device. In response to the change in resonance, the device acknowledges an action to take, akin to a mouse click, for example.

Another type of stylus includes an integrated circuit that may be powered through a scanning signal of a device. Other types of styli are battery powered.

As can be appreciated, with increased internal components, such as internal circuits, batteries, and/or the like, the time and cost of manufacturing a stylus increases. Accordingly, a need exists for a cost-effective stylus that includes an engagement member, such as a button or deflectable tip, that may be easily and efficiently operated.

SUMMARY

Certain embodiments of the present disclosure provide a system that may include a device including a user interface, a detector, and a central processing unit (CPU) in communication with the detector. The CPU controls operation of the device. The system may also include a stylus that includes a main body and an engagement member coupled to the main body. The engagement member alters a mechanical relationship in response to being engaged by a user. The stylus generates a signal in response to the altered mechanical relationship. The detector detects the signal generated by the stylus, and the CPU performs an action in response to detection of the signal.

The detector may include a magnetometer that detects the signal as a characteristic of a magnetic field.

The engagement member may include a moveable button secured to an outer shaft of the main body of the stylus. In at least one other embodiment, the engagement member includes a deflectable tip of the stylus.

The stylus may include a magnet. The altered mechanical relationship may include an altered position of the magnet in relation to the main body and the engagement member in response to the engagement member being engaged by the user. The signal may include a changing characteristic of a magnetic field generated by magnet.

In at least one embodiment, the magnet includes a first magnet that is coupled to the engagement member through a mechanical link. The first magnet linearly moves within a magnet chamber in response to engagement of the engagement member.

In at least one embodiment, the magnet includes a first magnet that is coupled to the engagement member through a mechanical link. The first magnet rotates within a magnet chamber in response to engagement of the engagement member.

In at least one embodiment, the stylus may include a biasing mechanism that returns the magnet to an at-rest position in response to disengagement of the engagement member.

The stylus may include a field-altering structure having an internal structure. A portion of the magnet is moved into the internal structure in response to engagement of the engagement member.

In at least one embodiment, the magnet includes a first magnet. The system may include a second magnet. The first magnet is moved in relation to the second magnet in response to engagement of the engagement member.

The system may include a container that contains a magnetic fluid and the magnet. The engagement member may be secured to the container to move the magnetic fluid in relation to the magnet.

The magnet may include a first magnet fixed in position within the stylus. The system may include a second magnet secured to a portion of the engagement member.

The stylus may be passive and devoid of electronics and a battery.

In at least one embodiment, the stylus may include a battery having a first electrical contact, a coil electrically coupled to the battery, and a second electrical contact extending from a portion of the engagement member. The first and second electrical contacts may be separated from one another in response to the engagement member being disengaged. The altered mechanical relationship includes the first and second electrical contacts electrically connecting in response to engagement of the engagement member. The signal may include an emitted signal from the coil in response to the first electrical contact electrically connecting with the second electrical contact.

Certain embodiments of the present disclosure provide a stylus that may include a main body, and an engagement member operatively coupled to the main body. The engagement member alters a mechanical relationship in response to being engaged by a user. The stylus generates a signal in response to the altered mechanical relationship.

Certain embodiments of the present disclosure provide a system that may include a device including a detector, and a stylus for use with the device. The stylus may include a main body and an engagement member coupled to the main body. The engagement member alters a mechanical relationship on or within the main body in response to being engaged by a user. The stylus generates a signal in response to the altered mechanical relationship. The detector detects the signal generated by the stylus.

DETAILED DESCRIPTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation.

The following description is intended only by way of example, and simply illustrates certain example embodiments.

Figure 1:
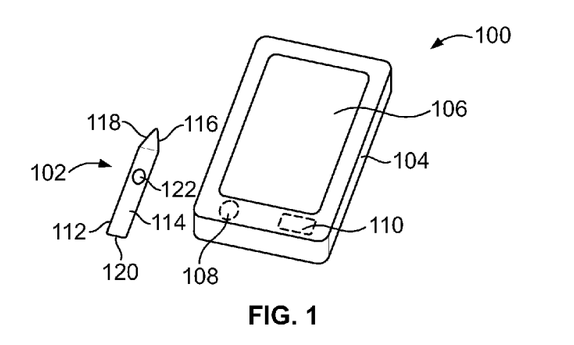
FIG. 1 illustrates a perspective view of a device having a stylus, according to an embodiment of the present disclosure.

FIG. 1 illustrates a perspective view of a device 100 having a stylus 102, according to an embodiment of the present disclosure. As shown, the device 100 may be a mobile device, such as a laptop computer, an electronic tablet, a cellular and/or smart phone, a personal digital assistant, watch, smart card, or other such handheld components, for example. In other embodiments, the device 100 may be a large structure that is not configured to be held in a hand, such as a television screen. The device 100 may be mobile or portable in that it may be readily moved from place to place by an individual, such as by being placed within a purse, bag, pocket, worn on a belt, or the like. Alternatively, the device 100 may be a personal computer.

The device 100 may include a main housing 104 that supports a user interface 106, such as a touch screen. The stylus 102 may be positioned on and moved over the user interface 106 to input data into the device 100. The main housing 104 also includes an engagement detector 108, such as a magnetometer, and a central processing unit (CPU) 110 that is in communication with the engagement detector 108 and is configured to control operation of the device 100.

The stylus 102 includes a main body 112 having an outer shaft 114. An input tip 116 is located at a distal end 118 that is opposite from a proximal end 120. An engagement member 122, such as a moveable button, may be located on a portion of the outer shaft 114. The engagement member 122 is configured to be engaged, such as by an individual pressing with a finger, to generate an action signal, which is used to facilitate selection of an item on screen, initiation of a click and drag operation, deletion of a displayed item on the user interface 106, highlighting of an item displayed on the user interface 106, activation of a command, and/or the like. Optionally, the engagement member 122 may be located at various other areas of the stylus 102. For example, the engagement member 122 may be a deflectable tip that is configured to be deflected inwardly to generate an action signal. The engagement member 122 is engaged to generate the action signal by altering a mechanical relationship within the stylus 102, as described below. Additionally, the stylus 102 may include an eraser device at the proximal end 120 that is configured to erase input data on a screen of a device, for example.

In operation, in response to engagement of the engagement member 122, the stylus 102 generates an action signal, which is detected by the engagement detector 108. The CPU 110, which is in communication with the engagement detector 108, senses and acknowledges the action signal and operates the device 100 according to an action that correlates with the action signal. For example, engagement of the engagement member 122 may change a characteristic of a magnetic field generated by one or more internal magnets within the stylus 102. The changing characteristic of the magnetic field may be recognized by the CPU 110 as the action signal. The engagement detector 108 may be a magnetometer that detects the change in the characteristic of the magnetic field. A magnetometer may be used to measure the magnetization of a magnetic material like a ferromagnetic structure, for example, and/or to measure the strength and/or direction of the magnetic field at a point in space.

In embodiments in which the engagement detector 108 is a magnetometer, the stylus 102 may be within a detectable range of the engagement detector 108. For example, if the stylus 102 is more than 6 inches from the device 100, the magnetic field of the Earth may overwhelm the magnetic field generated by the one or more magnets within the stylus 102. As such, the magnetometer is configured to detect engagement of the engagement member 122 when the stylus 102 is within a detectable range of the device 100. The detectable range may be between 0 to 12 inches of the user interface 106, for example. Alternatively, the detectable range may be greater than 12 inches from the user interface 106.

Figure 2:
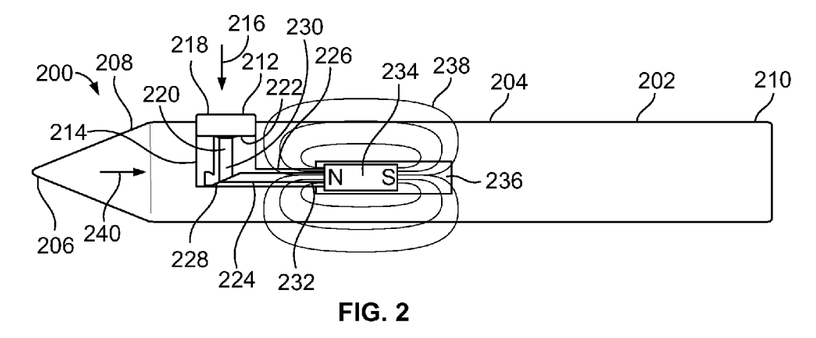
FIG. 2 illustrates a transverse cross-sectional view of a stylus, according to an embodiment of the present disclosure.

FIG. 2 illustrates a transverse cross-sectional view of a stylus 200, according to an embodiment of the present disclosure. The stylus 200 includes a main body 202 having an outer shaft 204. An input tip 206 is located at a distal end 208 that is opposite from a proximal end 210. An engagement member 212, such as a moveable button, is located on a portion of the outer shaft 204. As shown, the engagement member 212 may be a button moveably secured to the outer shaft 204.

The engagement member 212 is positioned within a channel 214 that allows the engagement member 212 to move into the channel 214 when pressed inwardly in the direction of arrow 216. The engagement member 212 includes an engagement surface 218 that is configured to be pressed by an individual. A beam 220, such as a rod, post, piston, column, or the like, that extends from an internal surface or underside 222 that is opposite from the engagement surface 218. The beam 220 contacts another beam 224 that is slidably secured within a channel 226 that is perpendicular to the channel 214. The beam 224 may include a tapered end 228 that abuts into an end 230 of the beam 220. The beam 224 also includes a magnet end 232 that is opposite from the tapered end 228. The magnet end 232 connects to a magnet 234 within a magnet chamber 236. The magnet 234 generates a magnetic field 238 that may be detected by the engagement detector 108 (shown in FIG. 1), such as a magnetometer.

In operation, to perform a particular action, the engagement member 212 is pressed in the direction of arrow 216. As the engagement member 212 is inwardly pressed, the beam 220 is urged into the tapered end 228, thereby forcing the beam 224 to slide within the channel 226 in the direction of arrow 240. In response the magnet 234 linearly moves within the magnet chamber 236 in the direction of arrow 240. As the magnet 234 linearly moves within the magnet chamber 236, one or more characteristics of the magnetic field 238 change. For example, an amplitude, direction and/or strength of the magnetic field 238 changes as the magnet 234 moves within the magnet chamber 236. The engagement detector 108 senses one or more changing characteristics of the magnetic field 238 as an action signal that is received by the CPU 110 (shown in FIG. 1). As such, as the engagement member 212 is engaged, one or more characteristics of the magnetic field 238 output by the magnet change, which is then detected by the engagement detector 108 and acknowledged by the CPU 110 as a detectable action. As the engagement member 212 is released, the magnet 234 and the beams 220 and 224 return to their at-rest positions.

Accordingly, the stylus 200 includes the engagement member 212, such as a button, that may be engaged to perform a particular action without the use of an internal circuit, battery, or the like. In this manner, the stylus 200 is a passive stylus 200. The stylus 200 is devoid of electronics, batteries, and the like. Instead, the stylus 200 includes an engagement member 212 that is mechanically linked to the magnet 234. As the engagement member 212 is engaged, the mechanical link moves the magnet, thereby changing one or more characteristics of the magnetic field 238, which is detected by an engagement detector, such as the engagement member 108, of a device to perform an action associated with the engagement of the engagement member 212.

Figure 3:
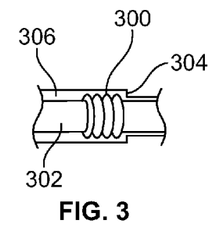
FIG. 3 illustrates a simplified view of a biasing mechanism secured to a beam, according to an embodiment of the present disclosure.

FIG. 3 illustrates a simplified view of a biasing mechanism 300 secured to a beam 302, according to an embodiment of the present disclosure. The biasing mechanism 300 may be or otherwise include a coil spring secured around an outer shaft of the beam 302, such as the beam 224. The biasing mechanism 300 may abut into a ledge 304 at an end of a channel 306, such as the channel 226 (shown in FIG. 2). As such, as an engagement member is pressed, the biasing mechanism 300 may compress against the ledge 304. As the engagement member is disengaged, the biasing mechanism may expand back to its at-rest position, thereby forcing the beam 302 and the magnet that attaches to the beam 302 back to at-rest positions. Alternatively, the biasing mechanism 300 may be various other types of mechanisms other than a coil spring. For example, the biasing mechanism 300 may be a leaf spring, a resilient, flexible loop, such as a rubber band that connects to the beam 302 and is anchored to a structure within the stylus, and/or the like.

Figure 4:
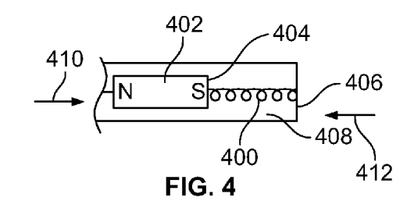
FIG. 4 illustrates a simplified view of a biasing mechanism secured to a magnet, according to an embodiment of the present disclosure.

FIG. 4 illustrates a simplified view of a biasing mechanism 400 secured to a magnet 402, according to an embodiment of the present disclosure. The biasing mechanism 400 may be a coil spring that extends between an end 404 of the magnet 402 and a barrier wall 406 that defines an end of a magnet chamber 408. As an engagement member is pressed, the magnet 402 moves toward the barrier wall 406 in the direction of arrow 410, thereby compressing the biasing mechanism 400. As the engagement member is released, the biasing mechanism 400 expands back to its at-rest position, thereby moving the magnet 402 back in the direction of arrow 412.

The biasing mechanisms described above may be used with any of the embodiments of the present disclosure.

Figure 5:
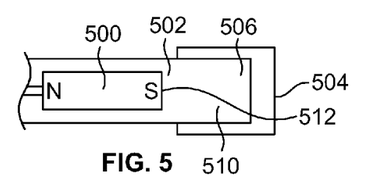
FIG. 5 illustrates a simplified view of a magnet within a magnet chamber, according to an embodiment of the present disclosure.

FIG. 5 illustrates a simplified view of a magnet 500 within a magnet chamber 502, according to an embodiment of the present disclosure. A field-altering structure 504, such as a metal cup, U-shaped shield, or the like, may be disposed at a distal end 506 of the magnet chamber 502. The magnet 500 may be moved within the magnet chamber 502, such as described above. As the magnet 500 moves within an internal chamber 510 of the field-altering structure 504, one or more characteristics of the magnetic field of the magnet 500 are altered. For example, the amplitude of the magnetic field may be attenuated by the field-altering structure 504. In at least one embodiment, as the magnet 500 is moved into the internal chamber 510, an end pole 512 of the magnet 500 may abut into the field-altering structure, thereby significantly altering the generated magnetic field. The field-altering structure 504 may be used with any embodiments of the present disclosure.

Figure 6:
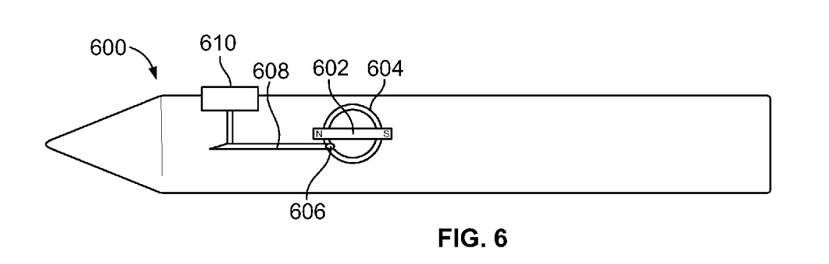
FIG. 6 illustrates a transverse cross-sectional view of a stylus, according to an embodiment of the present disclosure.

FIG. 6 illustrates a transverse cross-sectional view of a stylus 600, according to an embodiment of the present disclosure. The stylus 600 is similar to the stylus 200, except that a magnet 602 is connected to a rotary base 604 that is pivotally connected to magnet end 606 of a beam 608. Accordingly, as an engagement member 610 is pressed, the magnet 602 is rotated, such as to a position that is perpendicular to its at-rest position. An engagement detector detects a changing characteristic of a magnetic field of the magnet 602, such as a direction of the magnetic field, as described above.

Figure 7:
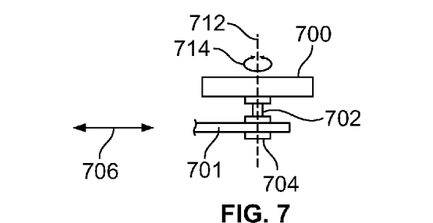
FIG. 7 illustrates a simplified view of a magnet rotatably coupled to a beam, according to an embodiment of the present disclosure.

FIG. 7 illustrates a simplified view of a magnet 700 rotatably coupled to a beam 701 according to an embodiment of the present disclosure. The magnet 700 may be connected to a post 702, which is in turn rotatably connected to the beam 701, such as through a rotatable bearing 704 that is rotatably secured within a guide channel formed through the beam 701. As such, as the beam 701 is linearly moved in the directions of arrow 706, the rotatable bearing 704 spins the post 702 about a central longitudinal axis 712 in the directions of arc 714, thereby rotating the magnet 700 in response. The embodiment shown in FIG. 7 is one example of a system and method for rotating the magnet 700. It is to be understood that various other systems and methods for rotating the magnet 700 within a stylus may be used. For example, the beam 701 may be or otherwise include a worm screw that is operatively connected to the magnet 700.

Figure 8:
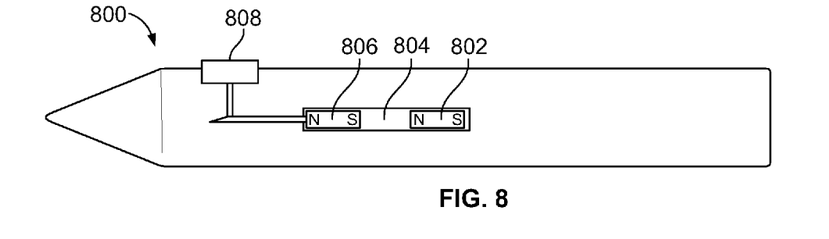
FIG. 8 illustrates a transverse cross-sectional view of a stylus, according to an embodiment of the present disclosure.

FIG. 8 illustrates a transverse cross-sectional view of a stylus 800, according to an embodiment of the present disclosure. The stylus 800 is similar to the stylus 200, except that multiple magnets may be positioned within the stylus 800. For example, a fixed magnet 802 may be secured at an end of a magnet chamber 804, while a moveable magnet 806 that is operatively connected to an engagement member 808, such as described above, may be positioned at an opposite end of the magnet chamber 804. As the engagement member 808 is pressed, the magnet 806 moves toward the magnet 802, thereby changing one or more characteristics of a combined magnetic field of the magnets 802 and 806. An engagement detector detects a changing characteristic of the magnetic field, as described above.

Figures 9, 10:
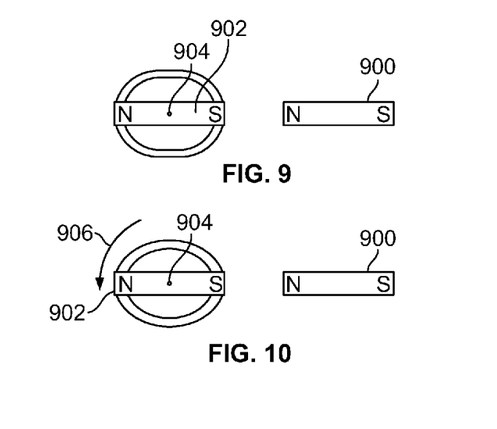
FIG. 9 illustrates a simplified view of a fixed magnet and moveable magnet in an attractive orientation within a stylus, according to an embodiment of the present disclosure.
FIG. 10 illustrates a simplified view of a fixed magnet and moveable magnet in a repelling orientation within a stylus, according to an embodiment of the present disclosure.

FIG. 9 illustrates a simplified view of a fixed magnet 900 and moveable magnet 902 in an attractive orientation within a stylus, according to an embodiment of the present disclosure. The moveable magnet 902 may be operatively connected to an engagement member, such as described above, and may be configured to be rotated about an axis 904, as described above. As shown in FIG. 9, the magnets 900 and 902 are in an attractive orientation, such that a North pole of the magnet 900 is proximate to a South pole of the magnet 902. In this orientation, an engagement detector, such as the engagement detector 108 (shown in FIG. 1) detects a first magnetic field having particular characteristics.

FIG. 10 illustrates a simplified view of the fixed magnet 900 and the moveable magnet 902 in a repelling orientation within a stylus, according to an embodiment of the present disclosure. As an engagement member is engaged to rotate the moveable magnet 902 about the axis 904 in the direction of arc 906, a second magnetic field having one or more different characteristics than the first magnetic field is generated and detected by the engagement detector, as described above. As shown, upon full engagement of the engagement member, the North pole of the magnet 900 is proximate to the North pole of the magnet 902, thereby causing a repelling magnetic force therebetween. As such, when the engagement member is disengaged, the repelling force rotates the magnet 902 back to its at-rest position (as shown in FIG. 9), which thereby forces the engagement member back to an at-rest position. As such, the repelling orientation of the magnets 900 and 902 may provide an automatic biasing mechanism without the need for a separate and distinct biasing mechanism.

Figure 11:
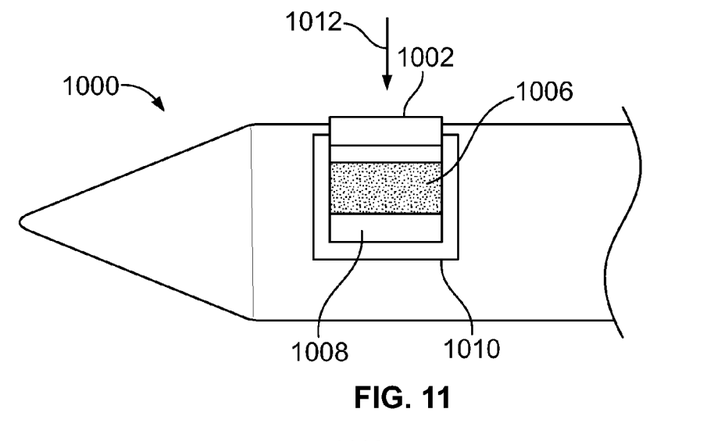
FIG. 11 illustrates a transverse cross-sectional view of a stylus, according to an embodiment of the present disclosure.

FIG. 11 illustrates a transverse cross-sectional view of a stylus 1000, according to an embodiment of the present disclosure. In this embodiment, an engagement member 1002 is moveably secured to a container 1004, such as fluid-tight bladder, that contains a magnetic fluid 1006. A magnet 1008 is positioned at a base 1010 of the container 1004. Alternatively, the magnet 1008 may be positioned at various other areas of the container 1004. The magnetic fluid 1006 may include ferrous particles suspended in a liquid, such as a suspending oil. As the engagement member 1002 is engaged in the direction of arrow 1012, the engagement member 1002 compresses the magnetic fluid 1006 toward and onto the magnet 1008, thereby altering one or more characteristics of the magnetic field generated by the magnet 1008. The change of the one or more characteristics of the magnetic field is detected by an engagement detector, as described above. As the engagement member 1002 is released, the magnetic fluid 1006 is drawn back.

Figure 12:
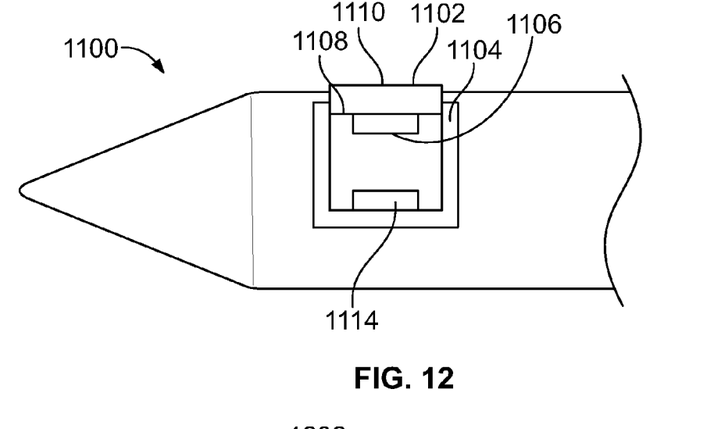
FIG. 12 illustrates a transverse cross-sectional view of a stylus, according to an embodiment of the present disclosure.

FIG. 12 illustrates a transverse cross-sectional view of a stylus 1100, according to an embodiment of the present disclosure. In this embodiment, an engagement member 1102 is moveably secured within a chamber 1104. A first magnet 1106 is secured to an underside 1108 of the engagement member 1102 that is opposite an engagement surface 1110. A second magnet 1114 is fixed within the chamber 1104. As the engagement member 1102 is moved within the chamber 1104, the distance between the magnets 1106 and 1114 changes, thereby changing one or more characteristics of a magnetic field that is detected by an engagement detector, as described above.

Figure 13:
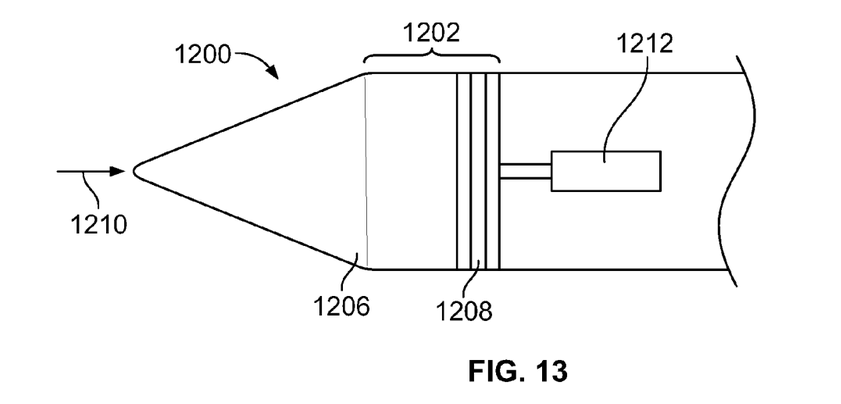
FIG. 13 illustrates a transverse cross-sectional view of a stylus, according to an embodiment of the present disclosure.

FIG. 13 illustrates a transverse cross-sectional view of a stylus 1200, according to an embodiment of the present disclosure. The stylus 1200 is similar to those described above, except that instead of a button, an engagement member 1202 may be in the form of a deflectable tip having a distal tip portion 1206 connected to a moveable member 1208, such as a collar, bellows, or the like. In order to engage the engagement member 1202, the deflectable tip is pushed inwardly in the direction of arrow 1210, such as when compressed against a surface of a user interface of a device, for example. The moveable member 1208 is, in turn, operatively connected to one or more magnets 1212, such as with respect to any of the embodiments described above.

Figure 14:
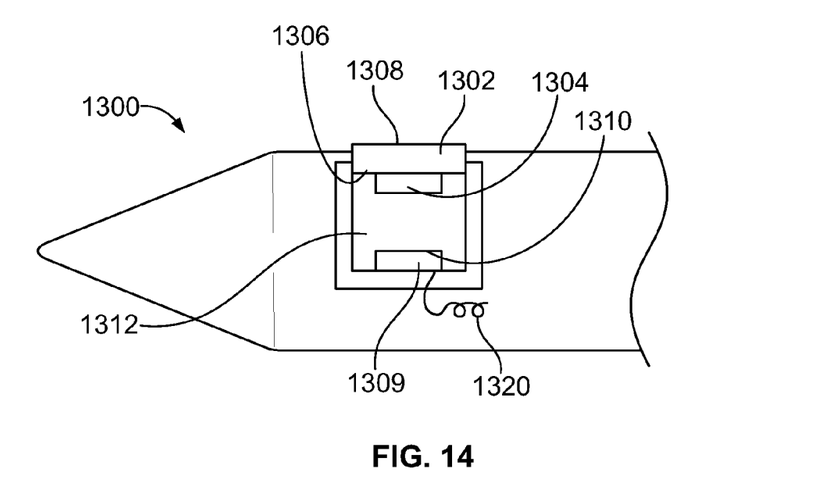
FIG. 14 illustrates a transverse cross-sectional view of a stylus, according to an embodiment of the present disclosure.

FIG. 14 illustrates a transverse cross-sectional view of a stylus 1300, according to an embodiment of the present disclosure. The stylus 1300 includes an engagement member 1302 that includes an electrical contact 1304 on an underside 1306 that is opposite from an engagement surface 1308. The electrical contact 1304 is positioned over a battery 1309 having an electrical contact 1310 within an internal chamber 1312. In an at-rest position, when the engagement member 1302 is not engaged by an individual, the electrical contacts 1304 and 1310 are separated from one another. When the engagement member 1302 is engaged, such as by being pressed inwardly, the electrical contacts 1304 and 1310 connect, thereby forming an electrical connection therebetween, and drawing power from the battery 1309, which may then energize an internal coil 1320 to generate a magnetic or an electromagnetic signal, for example. The energized coil 1320 may produce an action signal that is detected by an engagement detector, such as the engagement detector 108 (shown in FIG. 1), which may be used to indicate a detectable action, as described above. Thus, while the stylus 1300 may include the battery 1309, the life of the battery is prolonged, as power is only drawn therefrom when the engagement member 1302 is engaged.

Referring to FIGS. 1-14, embodiments of the present disclosure provide a cost-effective stylus that includes an engagement member, such as a button or deflectable tip. Embodiments of the present disclosure provide a stylus having an engagement member that is operatively connected to one or more mechanical connections within the stylus that are used to generate a detectable action signal. The mechanical connections may include a mechanical link between the engagement member and one or more internal magnets. In at least one other embodiment, the mechanical connections may include a separable mechanical interface between an electrical contact secured to the engagement member and an electrical contact of a battery, from which power is only drawn when the engagement member is engaged to move the electrical contacts into an electrical connection.

The stylus may include an engagement member that is configured to be engaged to generate an action signal, such as a changing characteristic of a magnetic field, or an output signal, in response to an altered mechanical relationship within the stylus. The altered mechanical relationship may include movement of a magnet within the stylus, or connection of an electrical contact secured to the engagement member and an electrical contact of a battery within the stylus. The action signal includes at least one variable characteristic that is detected by an engagement detector of a device, which determines a detectable action in response to reception of the signal.

Figure 15:
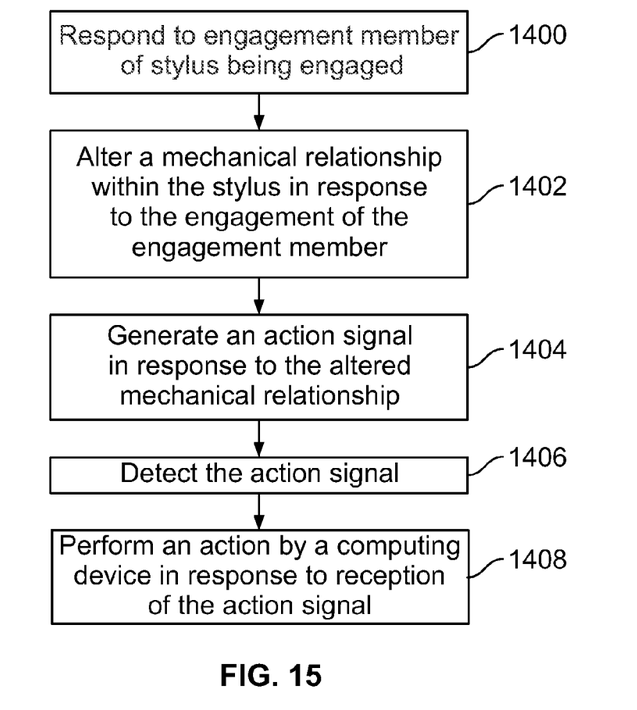
FIG. 15 illustrates a flow chart of a method of operating a stylus, according to an embodiment of the present disclosure.

FIG. 15 illustrates a flow chart of a method of operating a stylus, according to an embodiment of the present disclosure. At 1400, an engagement member of a stylus responds in response to being engaged. For example, the engagement member may be a button on the stylus that responds in response to being pressed by an individual. Alternatively, the engagement member may be a deflectable tip that is compressed and clicked by an individual.

At 1402, a mechanical relationship within the stylus is altered in response to the engagement of the engagement member. For example, as the engagement member is engaged, one or more magnets within the stylus may move. As another example, as the engagement member is engaged, an electrical contact secured to the engagement member may connect to an electrical contact of a battery, thereby forming an electrical connection therebetween.

At 1404, an action signal is generated in response to the altered mechanical relationship. For example, the action signal may be one or more changed characteristics of a magnetic field generated by one or more magnets. In at least one other embodiment, the action signal may be an output signal from a coil connected to a battery having an electrical contact that electrically connects to an electrical contact secured to the engagement member.

At 1406, the action signal is detected. For example, an engagement detector, such as a magnetometer and/or a sensing coil, may detect the action signal.

At 1408, an action is performed by a device in response to reception of the action signal. For example, the device may highlight displayed data, delete displayed data, enter a click and drag mode, and, or the like, in response to reception of the action signal.

Figure 16:
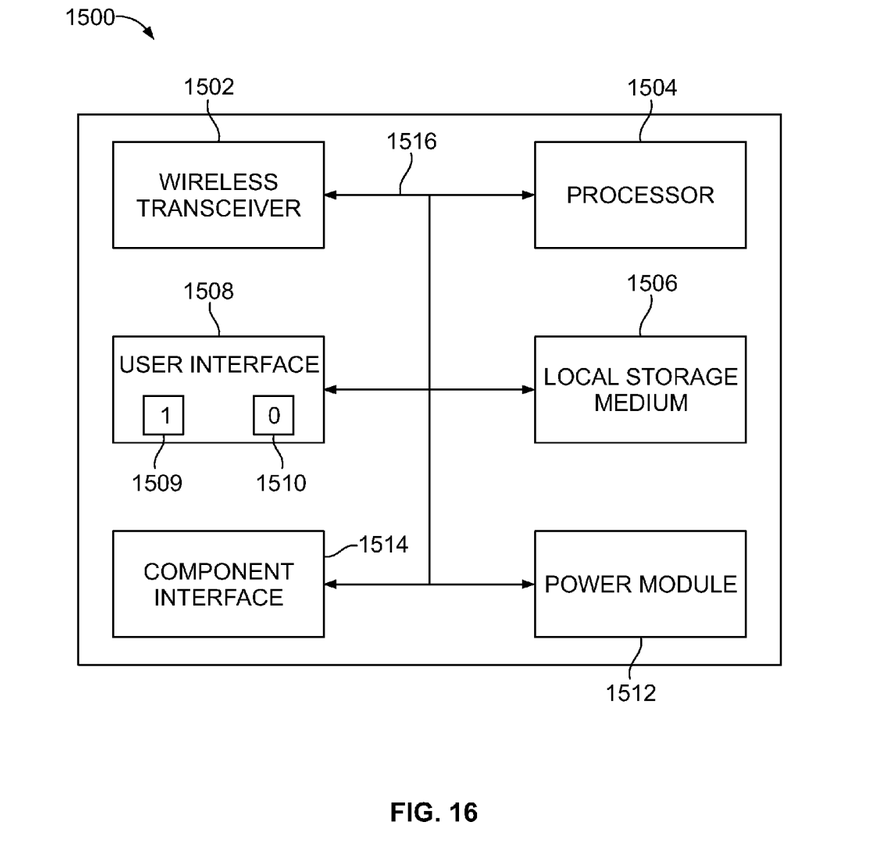
FIG. 16 illustrates a simplified block diagram of a mobile device, according to an embodiment of the present disclosure.

FIG. 16 illustrates a simplified block diagram of a mobile device 1500, according to an embodiment of the present disclosure. The mobile device 1500 is an example of a mobile device that may include a stylus, such as any of those described above. The mobile device 1500 may include one or more wireless transceivers 1502, one or more processors 1504 (e.g., a microprocessor, microcomputer, application-specific integrated circuit, etc.), one or more local storage media (also referred to as a memory portion) 1506, a user interface 1508 (such as a display screen that may include a touchscreen interface) which may include one or more input devices 1509 and one or more output devices 1510, a power module 1512, and a component interface 1514. All of these components can be operatively coupled to one another, and can be in communication with one another, by way of one or more internal communication links 1516, such as an internal bus.

The input and output devices 1509, 1510 may each include a variety of visual, audio, and/or mechanical devices. For example, the input devices 1509 can include a visual input device such as an optical sensor or camera, an audio input device such as a microphone, and a mechanical input device such as a keyboard, keypad, selection hard and/or soft buttons, switch, touchpad, touch screen, icons on a touch screen, a touch sensitive areas on a touch sensitive screen and/or any combination thereof. Similarly, the output devices 1510 can include a visual output device such as a liquid crystal display screen, one or more light emitting diode indicators, an audio output device such as a speaker, alarm and/or buzzer, and a mechanical output device such as a vibrating mechanism. The display may be touch sensitive to various types of touch and gestures. As further examples, the output device(s) 1510 may include a touch sensitive screen, a non-touch sensitive screen, a text-only display, a smart phone display, an audio output (e.g., a speaker or headphone jack), and/or any combination thereof.

The local storage medium 1506 can encompass one or more memory devices of any of a variety of forms (e.g., read only memory, random access memory, static random access memory, dynamic random access memory, etc.) and can be used by the processor 1504 to store and retrieve data. The data that is stored by the local storage medium 1506 can include, but need not be limited to, operating systems, applications, user collected content and informational data. Each operating system includes executable code that controls basic functions of the communication device, such as interaction among the various components, communication with external devices via the wireless transceivers 1502 and/or the component interface 1514, and storage and retrieval of applications and data to and from the local storage medium 1506. Each application includes executable code that utilizes an operating system to provide more specific functionality for the communication devices, such as file system service and handling of protected and unprotected data stored in the local storage medium 1506.

Other applications stored in the local storage medium 1506 may include various application program interfaces (APIs). The power module 1512 may include a power supply, such as a battery, for providing power to the other components while enabling the mobile device 1500 to be portable, as well as circuitry providing for the battery to be recharged. The component interface 1514 provides a direct connection to other devices, auxiliary components, or accessories for additional or enhanced functionality, and in particular, can include a USB port for linking to a user device with a USB cable.

Each transceiver 1502 can utilize a known wireless technology for communication. Exemplary operation of the wireless transceivers 1502 in conjunction with other components of the mobile device 1500 may take a variety of forms and may include, for example, operation in which, upon reception of wireless signals, the components of mobile device 1500 detect communication signals and the transceiver 1502 demodulates the communication signals to recover incoming information, such as voice and/or data, transmitted by the wireless signals. After receiving the incoming information from the transceiver 1502, the processor 1504 formats the incoming information for the one or more input devices 1509. Likewise, for transmission of wireless signals, the processor 1504 formats outgoing information, which may or may not be activated by the input devices 1510, and conveys the outgoing information to one or more of the wireless transceivers 1502 for modulation to communication signals. The wireless transceiver(s) 1502 convey the modulated signals to a remote device, such as a cell tower or a remote server (not shown).

In accordance with at least one embodiment herein, to the extent that mobile devices are discussed herein, it should be understood that they can represent a very wide range of devices, applicable to a very wide range of settings. Thus, by way of illustrative and non-restrictive examples, such devices and/or settings can include mobile telephones, tablet computers, and other portable computers such as portable laptop computers.

As will be appreciated, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the figures, which illustrate example methods, devices and program products according to various example embodiments. Program instructions may be provided to a CPU, such as a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

Although illustrative example embodiments have been described herein with reference to the accompanying figures, it is to be understood that this description is not limiting and that various other changes and modifications may be affected therein by one skilled in the art without departing from the scope or spirit of the disclosure.

The CPU, modules/applications, and/or the like herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the CPU, modules/controllers, and/or the like herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The CPU, modules/applications, and/or the like herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the CPU, for example, to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A system comprising:
a device including a user interface, a detector, and a central processing unit (CPU) in communication with the detector, wherein the CPU controls operation of the device; and
a stylus, wherein the stylus includes a main body, an engagement member coupled to the main body, a magnet, and a field-altering metal cup having an internal structure, wherein the engagement member alters a mechanical relationship in response to being engaged by a user, wherein a portion of the magnet is moved into the internal structure of the metal cup in response to engagement of the engagement member, wherein the altered mechanical relationship includes an altered position of the magnet in relation to the main body and the engagement member in response to the engagement member being engaged by the user, wherein the stylus generates a signal in response to the altered mechanical relationship, wherein the signal includes a changing characteristic of a magnetic field generated by magnet, wherein an amplitude of the magnetic field is attenuated when the portion of the magnet is moved into the internal structure of the metal cup,
wherein the detector detects the signal generated by the stylus, and wherein the CPU performs an action in response to detection of the signal.

2. The system of claim 1, wherein the detector comprises a magnetometer that detects the signal as a characteristic of a magnetic field.

3. The system of claim 1, wherein the engagement member comprises a moveable button secured to an outer shaft of the main body of the stylus.

4. The system of claim 1, wherein the engagement member comprises a deflectable tip of the stylus.

5. The system of claim 1, wherein the magnet includes a first magnet that is coupled to the engagement member through a mechanical link, wherein the first magnet linearly moves within a magnet chamber in response to engagement of the engagement member.

6. The system of claim 1, wherein the magnet includes a first magnet that is coupled to the engagement member through a mechanical link, wherein the first magnet rotates within a magnet chamber in response to engagement of the engagement member.

7. The system of claim 1, wherein the stylus further comprises a biasing mechanism that returns the magnet to an at-rest position in response to disengagement of the engagement member.

8. The system of claim 1, wherein the magnet includes a first magnet, and the system further comprises a second magnet, wherein the first magnet is moved in relation to the second magnet in response to engagement of the engagement member.

9. The system of claim 1, further comprising a container that contains a magnetic fluid and the magnet, wherein the engagement member is secured to the container to move the magnetic fluid in relation to the magnet.

10. The system of claim 1, wherein the magnet includes a first magnet fixed in position within the stylus, and the system further comprises a second magnet secured to a portion of the engagement member.

11. The system of claim 1, wherein the stylus is passive and devoid of electronics and a battery.

12. The system of claim 1, wherein the stylus further comprises:
a battery having a first electrical contact;
a coil electrically coupled to the battery; and
a second electrical contact extending from a portion of the engagement member, wherein the first and second electrical contacts are separated from one another in response to the engagement member being disengaged, wherein the altered mechanical relationship includes the first and second electrical contacts electrically connecting in response to engagement of the engagement member, and wherein the signal includes an emitted signal from the coil in response to the first electrical contact electrically connecting with the second electrical contact.

13. A stylus comprising:
a main body;
an engagement member operatively coupled to the main body, wherein the engagement member alters a mechanical relationship in response to being engaged by a user, wherein the stylus generates a signal in response to the altered mechanical relationship;
a battery having a first electrical contact;
a coil electrically coupled to the battery; and
a second electrical contact extending from a portion of the engagement member, wherein the first and second electrical contacts are separated from one another in response to the engagement member being disengaged, wherein the altered mechanical relationship includes the first and second electrical contacts electrically connecting in response to engagement of the engagement member, and wherein the signal includes an emitted signal from the coil in response to the first electrical contact electrically connecting with the second electrical contact.

14. The stylus of claim 13, further comprising a magnet, wherein the altered mechanical relationship includes an altered position of the magnet in relation to the main body and the engagement member in response to the engagement member being engaged by the user, wherein the signal includes a changing characteristic of a magnetic field generated by the magnet.

15. A system comprising:
a device comprising a detector; and a stylus for use with the device, wherein the stylus includes a main body, an engagement member coupled to the main body, a magnet, and a container that contains a magnetic fluid and the magnet, wherein the engagement member is secured to the container to move the magnetic fluid in relation to the magnet, wherein the engagement member alters a mechanical relationship on or within the main body in response to being engaged by a user, wherein the altered mechanical relationship includes an altered position of the magnet in relation to the main body and the engagement member in response to the engagement member being engaged by the user, wherein the stylus generates a signal in response to the altered mechanical relationship, wherein the signal includes a changing characteristic of a magnetic field generated by magnet, wherein the detector detects the signal generated by the stylus.

16. The system of claim 15, wherein the stylus is passive and devoid of electronics and a battery.

17. The system of claim 15, wherein the magnetic fluid is in direct contact with the magnet within the container.

* * * * *